Patented Oct. 12, 1926.

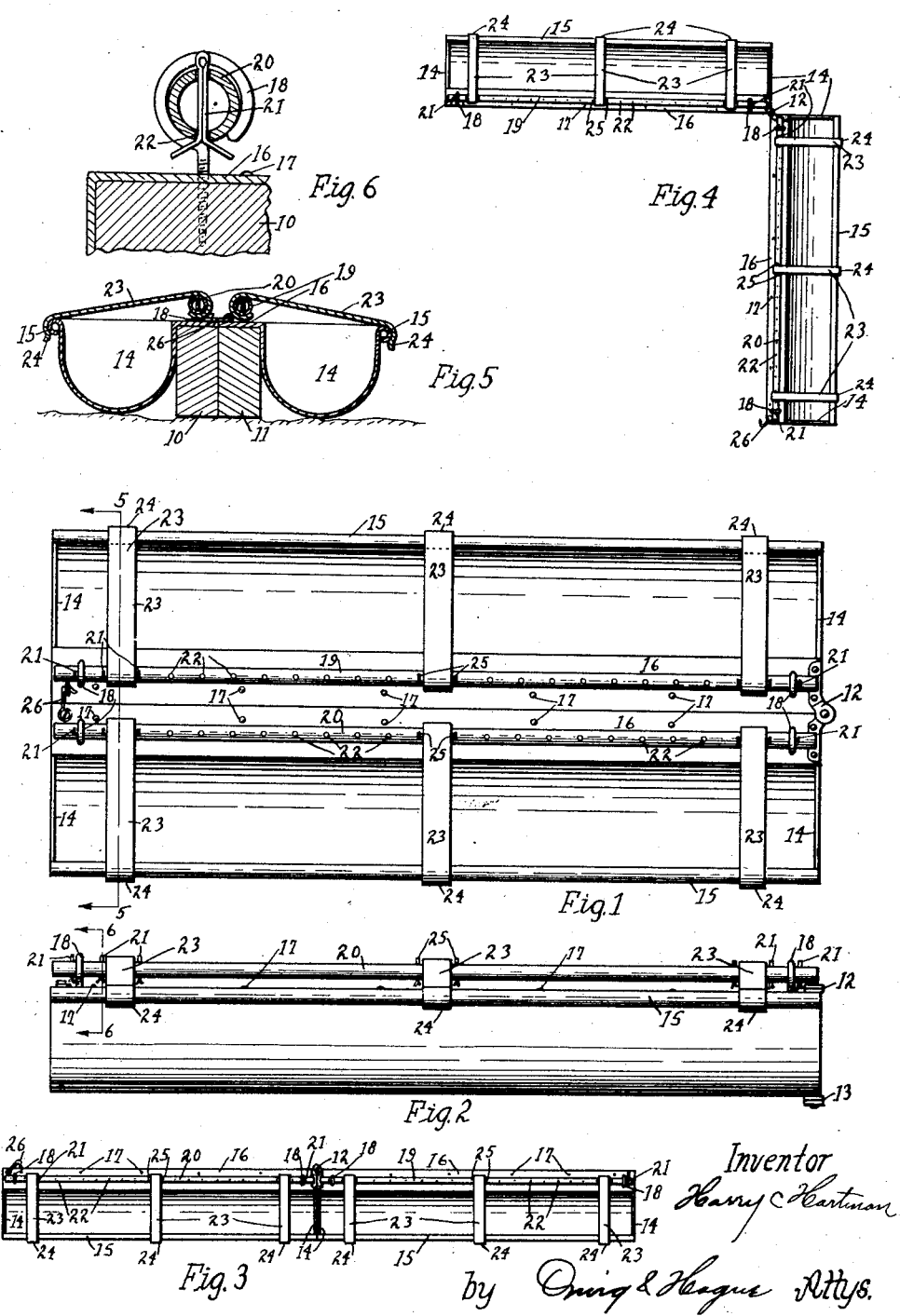

1,602,670

UNITED STATES PATENT OFFICE.

HARRY C. HARTMAN, OF BRADDYVILLE, IOWA.

HOG TROUGH.

Application filed October 6, 1925. Serial No. 60,865.

The object of my invention is to provide a hog trough of simple, durable and inexpensive construction.

A further object is to provide a trough of sheet metal which is sanitary, and may be easily and quickly cleaned, and which will, when in use, prevent the hogs from crowding.

A further object is to provide in a sheet metal hog trough improved means for reinforcing and strengthening the body portion of the trough, and at the same time provide means whereby the trough may be made to assume a number of different shapes, so it may be adapted to fit pens of various sizes and shapes.

A further object is to provide a hog trough having a series of guards for preventing the animals from crowding and also from getting into the trough, and to provide in connection therewith means whereby the said guards may be moved toward or from each other so the trough may be used for feeding animals of various sizes.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a top view of my improved trough.

Figure 2 is a side elevation of the same.

Figure 3 is a top view of the same showing the trough in a different form from that illustrated in Figure 1.

Figure 4 shows the trough in another form.

Figure 5 is a transverse sectional view of the trough taken on the line 5—5 of Figure 1.

Figure 6 is an enlarged, detail, sectional view taken on the line 6—6 of Figure 2.

My improved trough comprises preferably a pair of frame members 10 and 11, which are formed preferably of wood, said members being of the same dimensions, formed rectangular in cross section and placed on edge. One end of the member 10 is hinged to one end of the member 11 by means of a hinge member 12 supported on their top edges, and a hinge member 13 supported on their lower edges so that the members 10 and 11 may be swung parallel and adjacent to each other, as illustrated in Figures 2 and 5, so that the said members may be swung into position where they are at right angles, as shown in Figure 4, or in alignment with each other as shown in Figure 3.

Each of the members 10 and 11 is provided with a trough 14 which is formed of sheet metal having one of its edges provided with a rolled portion 15, and its opposite edge provided with a horizontally extending flange portion 16, secured to the upper edge of the members 10 and 11 by means of suitable nails 17. The troughs 14 are of the same length as the members 10 and 11, the bottom of the troughs being in a common plane with the bottom edges of said members 10 and 11.

The upper edge of each of the members 10 and 11 is also provided with a series of upwardly extending screw eyes 18, the screw eye of the member 10 being designed to receive a pipe 19, while the screw eye of the member 11 is designed to receive a pipe 20, said pipe being secured in position by means of cotter pins 21. Each of the pipes 19 and 20 is provided with a series of vertically and equally spaced openings 22. Each of the members 19 and 20 is provided with a series of pivoted division bars 23, the outer end of each of said bars being provided with a hook 24 designed to extend over the rolled portion 15, to lock them into position the bars being free to swing from a substantially horizontal position to a vertical position, and also free to move longitudinally on the said members 19 and 20, so that they may be spaced apart any desired distance. The said bars are held against longitudinal movement after they have been spaced by means of suitable cotter keys 25. The free ends of the members 10 and 11 may be fastened together by means of a hook 26.

By this arrangement it will be seen that when it is desired to drain the trough, the division bars 23 may be placed in a vertical position, after which the troughs may be easily drained. Any number of these bars may be provided and adjusted to suit animals of various sizes, by simply removing the cotter keys 25.

If it is desired to use the trough in an open lot, the two members 10 and 11 are folded against each other, as illustrated in Figure 1, which forms a trough of considerable width, and which is quite stable and not easily overturned; or it may be placed in position as illustrated in Figure 4, which also has the advantage of being quite rigidly supported. The trough may also be supported around the corner of a fence with the member 10 adjacent to one side, while the member 11 is adjacent to another side; or if it is desired to use the trough adjacent to a single wall, it may be placed in the position shown in Figure 3. By being able to fold the trough in a compact form, as shown in Figure 1, it will be seen that it may be easily crated for shipment.

I claim as my invention:

1. A trough comprising a pair of supporting members, one end of one of said members being pivotally connected to one end of the opposite member, a trough secured to one side of each of said members and so arranged that the said members may be folded adjacent to each other or may be moved to position in alinement with each other, a pivot member extending longitudinally above each of said supporting members, a series of division bars pivotally connected to each of said pivot members.

2. A trough comprising a pair of supporting members, one end of one of said members being pivotally connected to one end of the opposite member, a trough secured to one side of each of said members and so arranged that the said members may be folded adjacent to each other or may be moved to position in alinement with each other, a pivot member extending longitudinally above each of said supporting members, a series of division bars pivotally connected to each of said pivot members, and means for adjusting said bars longitudinally of said pivot members.

3. A trough formed in two sections, the end of one section being pivotally connected to one end of the other section, one of said sections being adapted to fold adjacent to the opposite section, means for locking said sections in said folded position, a series of division bars for each of said sections, and means for adjustably mounting said division bars toward and from each other.

4. A trough formed in two sections, the end of one section being pivotally connected to one end of the other section, one of said sections being adapted to fold adjacent to the opposite section, means for locking said sections in said folded positions, a series of division bars for each of said sections, means for adjustably mounting said division bars toward and from each other, said division bars being pivotally mounted at one end and adapted to swing from a horizontal to a vertical position, and means for locking said division bars in said horizontal position.

Des Moines, Iowa, January 21, 1925.

HARRY C. HARTMAN.